United States Patent

Farrell et al.

[11] Patent Number: 5,496,009
[45] Date of Patent: Mar. 5, 1996

[54] VALVE

[75] Inventors: Gregory A. Farrell, Ridgewood, N.J.; Kevin J. Hanmann, Cary, N.C.; Peter Schmitz, Carmel, N.Y.; Bruce E. Behringer, Park Ridge, N.J.; James A. Mawhirt, Brooklyn, N.Y.

[73] Assignee: Bayer Corporation, Tarrytown, N.Y.

[21] Appl. No.: 319,918

[22] Filed: Oct. 7, 1994

[51] Int. Cl.$^6$ ................................. F16K 31/128
[52] U.S. Cl. ............................... 251/61.1; 251/25
[58] Field of Search ..................... 137/884, 885; 251/61.1, 25, 45, 46; 92/96, 98 R

[56] References Cited

U.S. PATENT DOCUMENTS

| | | | |
|---|---|---|---|
| 3,176,714 | 4/1965 | Smith et al. | 137/596.16 |
| 3,312,238 | 4/1967 | Voit, Jr. | 251/61.1 |
| 3,782,682 | 1/1974 | Lale | 251/61.1 |
| 4,119,120 | 10/1978 | Mehaffey et al. | 251/61.1 |
| 4,168,724 | 9/1979 | Graffunder et al. | 251/61.1 |
| 4,304,257 | 12/1981 | Webster | 137/559 |
| 4,703,913 | 11/1987 | Hunkapiller | 251/61.1 |
| 4,723,131 | 2/1988 | Droit | 251/61.1 |
| 4,744,388 | 5/1988 | Ariizumi et al. | 251/61.1 |
| 4,848,722 | 7/1989 | Webster | 251/61.1 |
| 4,852,851 | 8/1989 | Webster | 251/61.1 |
| 4,858,883 | 8/1989 | Webster | 251/61.1 |
| 4,875,956 | 10/1989 | Brackett | 156/84 |

FOREIGN PATENT DOCUMENTS

| 1947533 | 3/1971 | Germany | 251/61.1 |
|---|---|---|---|
| 2235990 | 2/1973 | Germany | 251/61.1 |

Primary Examiner—George L. Walton
Attorney, Agent, or Firm—Orrick Herrington & Sutcliffe

[57] ABSTRACT

A valve comprises a first rigid layer having a substantially planar first surface, a second rigid layer having a substantially planar second surface facing the first surface and a substantially planar third surface opposite the second surface and a flexible layer positioned between the first and second surfaces. A valve chamber is demarcated by a concave surface in the substantially planar first surface and one surface of the flexible layer and at least one first fluid passageway in the first rigid layer opens into the valve chamber at the concave surface to alternatively apply a vacuum and pressure thereto. A fluid chamber is demarcated by another surface of the flexible layer and a concave-convex surface in the substantially planar second surface which comprises an inner circular convex portion and a concentric annular outer concave portion. At least two second fluid passageways in the second rigid layer open into the valve chamber at the convex surface. When a vacuum is applied to the valve chamber, the flexible layer flexes to space the other surface of the flexible layer apart from the concave-convex surface to permit communication between the at least two second fluid passageways and when a pressure is applied to the valve chamber, the flexible layer flexes to dispose the other surface of the flexible layer on the concave-convex surface to prevent communication between the at least two second fluid passageways.

16 Claims, 2 Drawing Sheets

VALVE

BACKGROUND OF THE INVENTION

The present invention relates to a valve assembly and in particular, a fluid valve with an elastomeric diaphragm.

Fluid valves of this type are known in the art, as can be seen for example in U.S. Pat. No. 4,852,851.

Early valves had a non-elastic diaphragm which necessitated equal deformations between open and closed positions.

In later prior art valves of this type, because of the geometry of the fluid and valve chambers formed therein, the flexible sheet member wrinkled and puckered as a result of the unequal deformations between the open and closed position of the valve, resulting in unreliable valve function due to improper sealing.

SUMMARY OF THE INVENTION

The main object of the present invention is to provide a valve which eliminates the disadvantages of prior art valves. The present invention provides higher sealing pressure, low dead volume, low carryover, long life, chemical compatibility and dense packaging.

Another object of the present invention is to provide a valve which alternately stops or allows the flow of a liquid or air through an acrylic or other manifold conduit which is fused or otherwise sealed. The fluid being controlled is isolated by an elastic diaphragm from the pressure/vacuum solenoid valve or mechanism.

A further object of the present invention is to provide a high density miniature valve with a small dead volume to provide a diaphragm configuration that permits equal deformation in both open and closed states.

These and other objects and advantages of the present invention are achieved in accordance with the present invention by a valve comprising a first rigid layer having a substantially planar first surface, a second rigid layer having a substantially planar second surface facing the first surface and a substantially planar third surface opposite the second surface, a flexible layer positioned between the first and second surfaces, a valve chamber demarcated by a concave surface in the substantially planar first surface and one surface of the flexible layer, a first fluid passageway in the first rigid layer opening into the fluid chamber at the concave surface to alternatively apply a vacuum and pressure thereto, a fluid chamber demarcated by the other surface of the flexible layer and a concave-convex surface in the substantially planar second surface. The concave-convex surface comprises an inner circular convex portion and a concentric annular outer concave portion. Two fluid passageways in the second rigid layer open into the valve chamber at the convex surface.

When a vacuum is applied to the valve chamber, the flexible layer flexes to space the other surface thereof apart from the concave-convex surface to permit communication between the two second fluid passageways. When a pressure is applied to the valve chamber, the flexible layer flexes to dispose the other surface of the flexible layer on the concave-convex surface to prevent communication between the two fluid passageways.

The valve also includes a third rigid layer having a substantially planar fourth surface facing the third surface. The two second fluid passageways comprise a channel in the third and fourth surfaces which are aligned when the second and third rigid layers are connected.

In this way, the fluid pathway is located in a plane which is displaced from the plane of the flexible layer. The concave-convex surface is a combination of shapes that provides for equal elastomer stretch deformation in both the open and closed positions, with positive closure in the closed position by providing a "positive wrap" around the shut passages.

The valve also contains an annulus which fully contains the extruded diaphragm material due to the perimeter compression required to seal the valve, eliminating compromising the elastic diaphragm performance and perimeter deformability.

The rigid layers are preferably acrylic plastic material which are preferably clear. The layers are preferably connected by diffusion, adhesive or solvent bonding as set forth in U.S. Pat. No. 4,875,956, the disclosure of which is hereby incorporated by reference. The layers can also be connected mechanically by fasteners such as bolts or screws.

The valve in accordance with the present invention is preferably used in unified fluid circuits for clinical diagnostic analyzers for hematology, chemistry, chemical and immunology.

These and other features and advantages of the present invention will be described in more detail with reference to the attached drawings wherein:

DETAILED DESCRIPTION OF THE INVENTION

Figure 1:
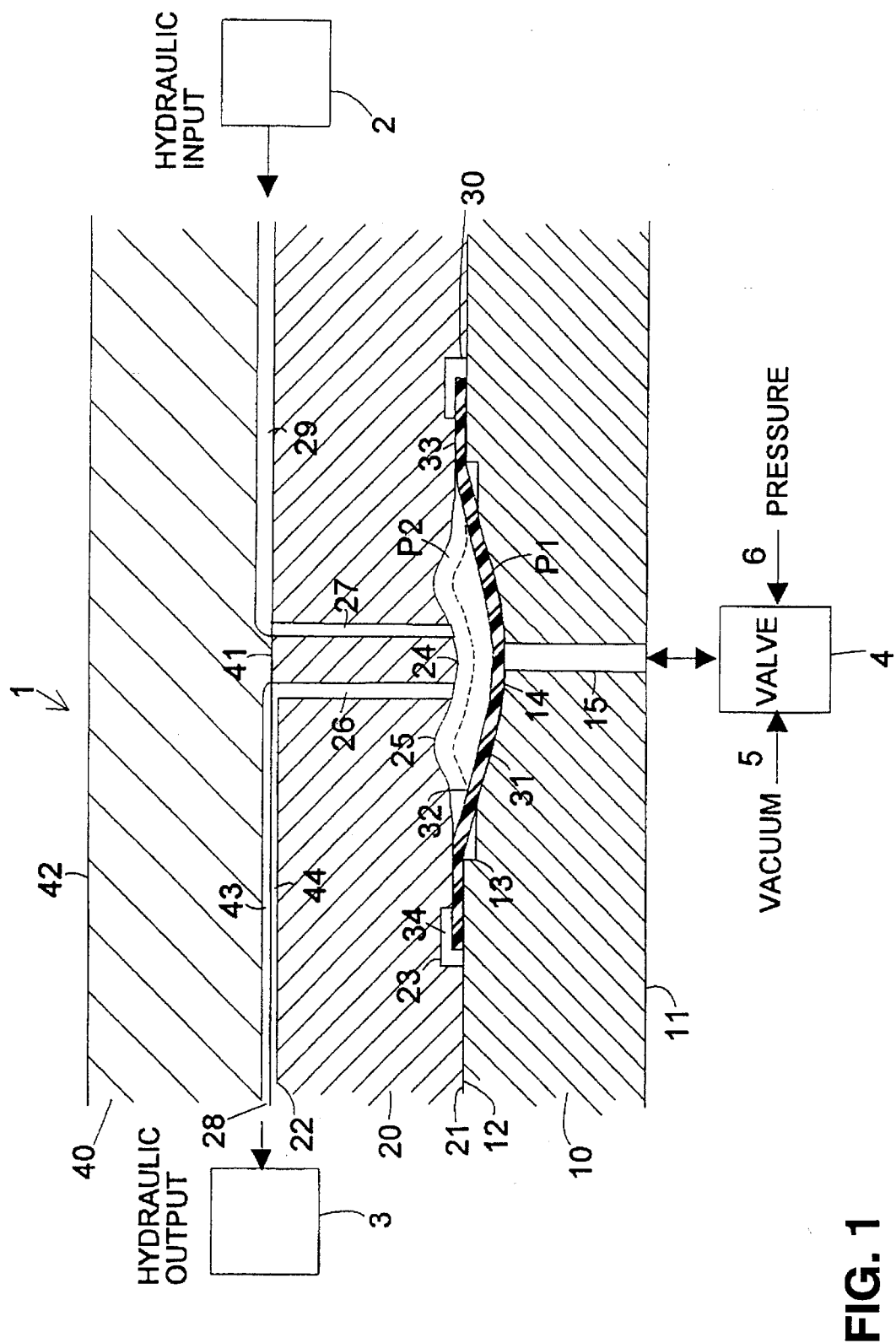
FIG. 1 is a sectional view of a valve according to the present invention.
Figure 2:
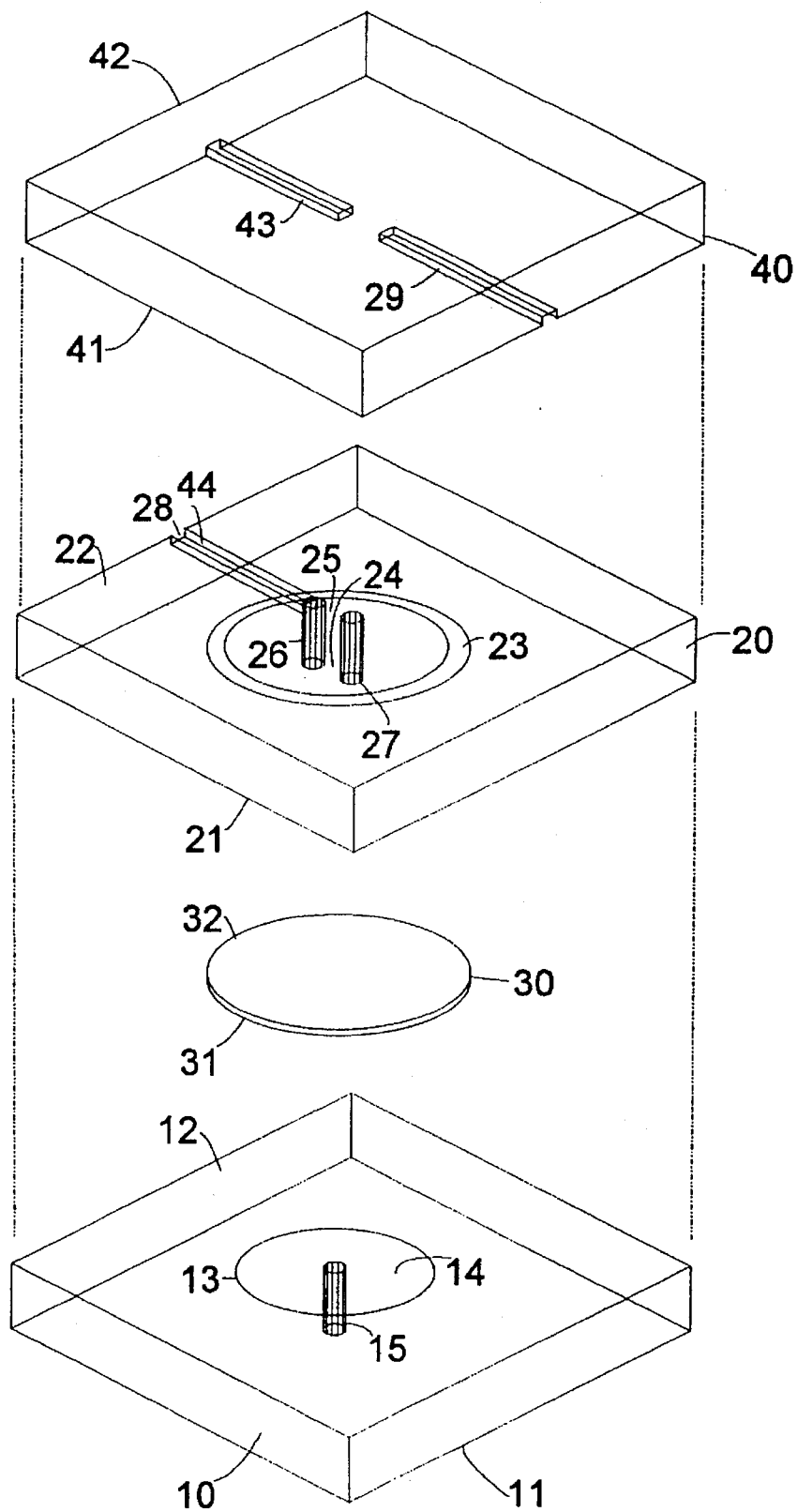
FIG. 2 is an exploded view of the valve of FIG. 1.

Referring now to FIGS. 1 and 2, the valve 1 comprises a first rigid layer 10 having substantially planar surfaces 11 and 12, a second rigid layer 20 having substantially planar surface 21 and 22 and a third rigid layer 40 having substantially planar surfaces 41 and 42. Disposed between surfaces 12 and 21 is a flexible layer 30 of elastomeric material such as rubber.

The valve further includes a valve chamber demarcated by a concave surface 14 in the planar surface 12 and by one surface 31 of the flexible layer 30. At least one fluid passageway 15 in the first rigid layer 10 opens into the valve chamber at the concave surface 14 and the fluid passageway 15 is connected to a valve 4 which alternately applies vacuum 5 or pressure 6 to the valve chamber.

The valve also includes a fluid chamber demarcated by the surface 32 of the flexible layer 30 and a concave-convex surface in the surface 21 comprising an inner circular convex portion 24 and a concentric annular outer concave portion 25.

The convex portion 24 preferably has a dome point at the center thereof and the tangent thereto is coplanar with the surface 21 of rigid layer 20. That dome point is aligned with the center of the concave surface 14.

Surface 12 also includes a compression-expansion relief annulus 13 which surrounds the concave surface 14. Surface 21 includes a compression-expansion relief channel 23 which surrounds the annulus 13 and the concave-convex surface and defines a compression zone 33 between the annulus 13 and the channel 23. The compression zone compresses the flexible layer 30 and the channel 23 provides for extruded diaphragm material. When the rigid layers 10 and 20 are connected together as shown in FIG. 1, the compression zone 33 acts to seal the periphery of the valve and fluid chambers.

The rigid layer 20 includes two fluid passageways 26 and 27 which open into the fluid chamber at the convex portion 24 and extend to the surface 22 thereof.

The rigid layer 20 has channel 44 formed in the surface 22 thereof and the rigid layer 40 has channel 43 in the surface thereof which is aligned with channel 44 to form fluid conduit 28. Fluid conduit 29 is formed in the surface 41 of layer 40. The surfaces 41 and 22 are bonded together by diffusion bonding in order to seal the passageways 28 and 29.

Channel 29 is in communication with passageway 27 and hydraulic input 2 and channel 28 is in communication with passageway 26 and hydraulic output 3.

In operation, when vacuum 5 is applied to the valve chamber through passageway 15, the flexible layer flexes into position P1 so that surface 32 is spaced apart from the convex portion 24 and the fluid chamber is open permitting communication between the hydraulic input 2 and the hydraulic output 3 via passageways 29, 27, 26 and 28.

When pressure 6 is applied to the valve chamber, the flexible layer 30 flexes into the closed position P2 so that the surface 32 is tightly against the convex and concave surfaces 24 and 25 preventing communication between the hydraulic input 2 and the hydraulic output 3.

As a result of the concave-convex surface, there will be equal elastomer stretch deformation in both the open and closed positions P1 and P2.

In one embodiment of the present invention, the rigid layers are composed of fully normalized clear cast acrylic and the flexible layer is composed of silicone sheeting. Each of the rigid layers are about 0.10" to 0.25" thick and the flexible layer is about 0.01" thick and has a diameter of about 0.375". Channel 23 has an inner diameter of 0.322" and an outer diameter of 0.4" and a height of 0.012". Annulus 13 has a diameter of 0.225" and steps down 0.005" from surface 12. Compression zone 33 has an inner diameter of 0.225" and an outer diameter of 0.322" and the surface 21 is stepped down by 0.009" in the compression zone.

Passageway 15 has a diameter of 0.031" and passageways 26 and 27 have a diameter of 0.02" and a center to center spacing of 0.05". Concave surface 31 has a diameter of 0.156", a spherical radius of 0.1" and a depth of 0.025". Convex portion 24 has an outer diameter of 0.156", an inner diameter of 0.06" and a radius of curvature of 0.02". Concave portion 24 has a diameter of 0.06" and a spherical radius of 0.08".

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A valve comprising:
   a first rigid layer having a substantially planar first surface;
   a second rigid layer having a substantially planar second surface facing the first surface and a substantially planar third surface opposite the second surface;
   a flexible layer positioned between the first and second surfaces;
   a valve chamber demarcated by a concave surface in the substantially planar first surface and one surface of the flexible layer;
   at least one first fluid passageway in the first rigid layer opening into the valve chamber at the concave surface to alternatively apply a vacuum and pressure thereto;
   a fluid chamber demarcated by another surface of the flexible layer and a concave-convex surface in the substantially planar second surface and comprising an inner circular convex portion defining a valve seat and a concentric annular outer concave portion spaced below said valve seat; and
   at least two second fluid passageways in the second rigid layer opening into the valve chamber at the valve seat;
   whereby when a vacuum is applied to the valve chamber the flexible layer flexes to space the other surface of the flexible layer apart from the concave-convex surface to permit communication between the at least two second fluid passageways and when a pressure is applied to the valve chamber, the flexible layer flexes across the concave-convex surface to positively wrap and seal around the convex portion of the concave-convex surface to prevent communication between the at least two second fluid passageways.

2. The valve according to claim 1, wherein the concave surface in the first surface and the convex portion of the concave-convex surface have common center points.

3. The valve according to claim 1, further comprising a compression-expansion relief annulus in the first substantially planar surface surrounding the concave surface and a compression-expansion relief channel in the second substantially planar surface surrounding the concave-convex surface and around the relief annulus to form a compression zone therebetween.

4. The valve according to claim 3, further comprising means connecting the first and second rigid layers with the flexible layer therebetween, whereby a portion of the flexible layer in the compression zone effects a sealing of the fluid and valve chambers.

5. The valve according to claim 1, further comprising a third rigid layer having a substantially planar fourth surface facing the third surface.

6. The valve according to claim 5, further comprising means connecting the second and third rigid layers with the third and fourth surfaces adjacent each other.

7. The valve according to claim 6, wherein the at least two second fluid passageways each comprise a channel in the third and fourth surfaces which are aligned when the second and third rigid layers are connected.

8. The valve according to claim 7, wherein the means connecting the second and third rigid layers comprises means forming a seal around the channels in the third and fourth surfaces.

9. The valve according to claim 8, wherein the first, second and third rigid layers comprise acrylic plastic.

10. The valve according to claim 9, wherein the means forming a seal comprises means forming a diffusion bond.

11. The valve according to claim 1, wherein the convex portion of the concave-convex surface has a center point which is coplanar with the first surface.

12. The valve according to claim 1, further comprising a third rigid layer having a substantially planar fourth surface facing the third surface wherein the second and third rigid layers are connected with the third and fourth surfaces adjacent each other.

13. The valve according to claim 12, wherein the at least two second fluid passageways each comprise a channel in the third and fourth surfaces which are aligned when the second and third rigid layers are connected.

14. The valve according to claim 13, further comprising a seal around the channels in the third and fourth surfaces.

15. The value according to claim 14, wherein the first, second and third rigid layers each comprise acrylic plastic.

16. The valve according to claim 15, wherein the seal comprises a diffusion bond between the second and third rigid layers.

* * * * *